United States Patent [19]

Okada

[11] Patent Number: 4,946,014

[45] Date of Patent: Aug. 7, 1990

[54] RETARDER

[75] Inventor: Masaki Okada, Fujisawa, Japan

[73] Assignee: Isuzu Motors Limited, Tokyo, Japan

[21] Appl. No.: 416,083

[22] Filed: Oct. 2, 1989

[30] Foreign Application Priority Data

Oct. 31, 1988 [JP] Japan .............................. 63-273021

[51] Int. Cl.$^5$ ............................................ B60K 41/28
[52] U.S. Cl. ................................. 192/4 B; 192/0.09; 188/291
[58] Field of Search ................... 192/4 B, 0.094, 0.09, 192/12 A; 188/291; 74/856

[56] References Cited

U.S. PATENT DOCUMENTS 4,630,507 12/1986 Kugler et al. ........................ 192/4 B
4,768,401 9/1988 Fuehrer et al. ..................... 192/4 B Primary Examiner—Leslie A. Braun
Assistant Examiner—Andrea Pitts
Attorney, Agent, or Firm—Dykema Gossett

[57] ABSTRACT

A retarder adapted for use on a vehicle comprises: a blower connected to a crankshaft of the vehicle; a clutch provided between the blower and the crankshaft for selectively disconnecting the blower from the crankshaft; a speed change mechanism including a plurality of shafts, gears and bearings and provided between the crankshaft and the blower; an oil pump driven by energy transmitted from the clutch and the blower for supplying lubrication oil to the speed change mechanism; a sensor for detecting the pressure of the lubrication oil supplied to the elements of the speed change mechanism; and a control unit for allowing the clutch to disconnect the blower from the crankshaft when the lubrication oil pressure detected by the sensor is below a certain value. The blower consumes energy of the engine which is transmitted from the crankshaft, thereby applying a brake force to the engine. When trouble, such as a seize-up of the bearings, occurs in the speed change mechanism, the rotation of the shafts of the speed change mechanism is decelerated. Thereupon, the oil pressure from the oil pump drops since the pump is driven by energy derived from the speed change mechanism. An excessive brake force is not applied to the crankshaft since the trouble is detected by the control unit and then the blower is disconnected from the crankshaft promptly.

9 Claims, 1 Drawing Sheet 4,946,014

RETARDER

BACKGROUND OF THE INVENTION

1. Technical Field

The present invention relates to a brake system or a retarder having a blower which picks up energy from a power transmission line of a vehicle and uses the energy to drive the blower, thereby applying a brake force to the vehicle, and particularly to a brake system which cuts off the energy from the power transmission line for the sake of safety when trouble occurs in the brake system.

2. Background Art

Generally, large vehicles such as a large bus or truck are equipped with an auxiliary brake system in addition to a main brake system (e.g., a foot brake) since they need a large braking force to stop. Fluid retarders and electrical retarders are well known in the art as the auxiliary brake system for the vehicle. However, these retarders generate a considerable amount of heat due to the energy conversion during braking. Therefore, a device for cooling a working medium is required. The cooling device raises the cost of the auxiliary brake system and makes the arrangement complicated.

On the other hand, the assignee of the present invention has developed another type of auxiliary brake system, namely a "Turbo Retarder," which is disclosed in Japanese Patent Application No. 62-136476. This application teaches a brake system employing a blower which is connected to the crankshaft of the engine via a clutch and a speed change mechanism. The blower is driven by the crankshaft and consumes energy from the engine, thereby applying a brake force to the engine. This arrangement does not require a device for cooling a working medium. However, if the gears of the speed change mechanism break or a seizure occurs in the bearings of the speed change mechanism, a duly large force is applied to the crankshaft. This might result in damage to the crankshaft or other members coupled with the crankshaft and, in turn, breakdown of the vehicle.

SUMMARY OF THE INVENTION

One object of the present invention is to provide an auxiliary brake system which does not apply a brake force to the power transmission line of the vehicle when trouble occurs in the speed change mechanism.

According to one aspect of the present invention, there is provided a brake system which comprises: a blower connected to a member of the power transmission line of the vehicle, namely the crankshaft; a clutch for selectively connecting/disconnecting the blower with/from the crankshaft; a speed change mechanism provided between the blower and the crankshaft and including a plurality of shafts, gears fixed to the shafts and bearings supporting the shafts; an oil supply device driven by energy transmitted between the clutch and the blower for supplying lubrication oil to the speed change mechanism; a sensor for detecting the pressure of the lubrication oil supplied to the speed change mechanism; and a control unit for allowing the clutch to disconnect the blower from the crankshaft when the lubrication oil pressure detected by the sensor is below a predetermined value.

When the blower is connected with the crankshaft of the engine via the clutch and driven by the energy from the crankshaft, the blower consumes the energy of the engine thereby applying a brake force to the engine. Also, under these conditions, the lubrication oil supply device is driven by the crankshaft and feeds the oil to the members of the speed change mechanism. During the deceleration effected by this brake system, if the gears of the speed change mechanism break or the bearings therein seize up, i.e., if the rotational speed of the gears of the shafts is lowered, the energy supplied to the oil supply device decreases since the oil supply device is driven by the energy transmitted between the clutch and the blower. When the oil pressure detected by the pressure sensor becomes lower than a predetermined value, the control unit commands the clutch to disconnect the blower from the crankshaft. If the blower is still connected with the crankshaft, the speed change mechanism applies a large brake force to the crankshaft. Therefore, the blower of the brake system never applies excessive brake force to the crankshaft and safe deceleration is ensured by the brake system.

DESCRIPTION OF THE PREFERRED EMBODIMENTS

A preferred embodiment of the present invention will now be described with reference to the accompanying drawings.

Figure 1:
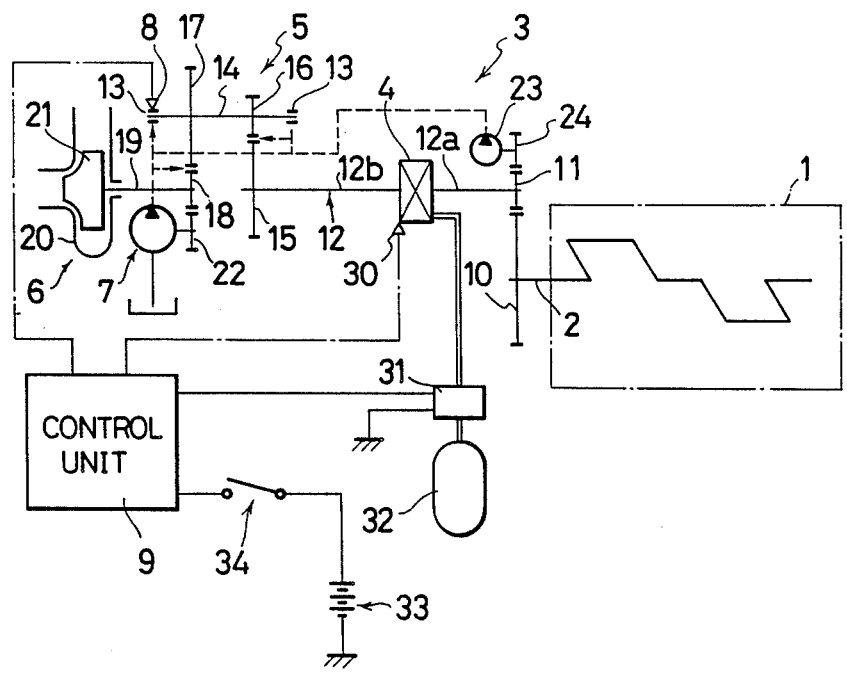
FIG. 1 is a systematic diagram of the brake system according to the present invention.

Referring to FIG. 1 of the accompanying drawings, numeral 1 designates an engine and a crankshaft, i.e., a member of a power transmission line of a vehicle, 2 is connected to a retarder 3. The retarder 3 serves as an auxiliary brake system relative to a main brake system, i.e., a foot brake (not shown).

The retarder 3 includes a blower 6 connected to the crankshaft 2 via a speed change mechanism 5 and a clutch 4 selectively connecting and disconnecting the blower 6 with or from the crankshaft 2, a lubrication oil supply device 7 driven by energy transmitted between the clutch 4 and the blower 6 for supplying lubrication oil to the speed change mechanism, a sensor 8 for detecting the pressure of the lubrication oil supplied to the speed change mechanism 5 and a control unit 9 for allowing the clutch 4 to disconnect the blower from the crankshaft when the detected oil pressure is below a predetermined value. More specifically, the crankshaft 2 is connected with a first shaft or an input shaft 12 of the speed change mechanism 5 via gears 10 and 11, and the input shaft 12 is connected with a second shaft 14 via a first set of gears 15 and 16 of the speed change mechanism. The second shaft 14 is supported by a couple of first bearings 13 disposed in a casing of the speed change mechanism 5. The second shaft 14 is also connected with a third shaft or an output shaft 19 of the speed change mechanism 5 via a second set of gears 17 and 18 of the speed change mechanism 5. The blower 6 includes an impeller 21 fixed to one end of the output shaft 19. The impeller 21 is rotatably housed in an impeller casing 20. The gear 18 meshes with an oil pump gear 22 which drives a main pump 7. The main pump 7 is the oil supply device in this embodiment. The lubrication oil is fed to the above-mentioned gears of the speed change mechanism 5 and the bearings 13 as indicated by the broken line in FIG. 1. One of the bearings 13 is provided with a pressure sensor 8 detecting the pressure of the oil fed to the bearing 13. In this embodiment, the sensor 8 includes a pressure switch which is turned off when the oil pressure is not more than the predetermined value. The gear 11 fixed to the input shaft 12 meshes with a gear 24 which drives an auxiliary pump 23 of a capacity smaller than the main pump 7. The auxiliary pump 23 also feeds the lubrication oil to the bearings 13 and other members in the speed change mechanism 5. The predetermined value required to turn off the pressure switch 8 is greater than the oil pressure supplied from the auxiliary pump 23.

Figure 2:
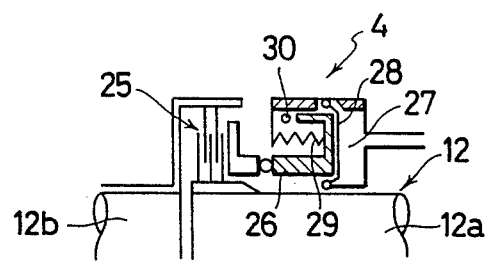
FIG. 2 is an enlarged sectional view of a clutch of FIG. 1.

The input shaft 12 has two segments 12a and 12b, and it is provided with a clutch 4 for selectively disconnecting these segments 12a and 12b from each other. As shown in FIG. 2, the input shaft 12 includes a plurality of clutch plates 25, a pressing member 26 for engaging the clutch plates 25 with each other, a diaphragm 28 for pressing the member 26 (to the left in the drawing) to engage the clutch plates 25 with each other and a spring 29 for biasing the member 26 toward the original position thereof (toward the right in the drawing). The clutch 4 is also provided with a switch 30 which is turned on when the member 26 is moved against the spring 29 and engages the clutch plates 25 with each other.

A pressure chamber 27 is defined in the clutch 4, and an air tank 32 (FIG. 1) is connected to the pressure chamber 27 via an electromagnetic valve 31 (FIG. 1). The pressurized air in the tank 32 is introduced into the pressure chamber 27 when the electromagnetic valve 31 is turned on, whereas the air in the pressure chamber 27 is expelled when the valve 31 is turned off.

Between the electromagnetic valve 31 and a power source 33 for the control unit 9, there are provided a main switch 34 and the control unit 9. The control unit 9 performs the following control: when the vehicle needs an auxiliary brake force and the main switch 34 is turned on (under these conditions, the pressure switch 8 is turned off), the control unit 9 turns on the electromagnetic valve 31, thereby engaging the clutch 4 and turning on the pressure switch 8. However, when trouble occurs in the speed mechanism 5, the control unit 9 turns off the electromagnetic valve 31 upon turning off of the pressure switch 8, thereby disengaging the clutch 4, even if the main switch 34 is in the ON position. During normal driving, the main switch 34 is turned off, so that the clutch 4 is not engaged, and the blower 6 is not driven by the engine. During long downhill driving, for example, or when auxiliary brake force is required, the main switch 34 is turned on (prior to this state of conditions, the pressure switch 8 is in the OFF position). As the main switch 34 is turned on, the electromagnetic valve 31 is turned on by the control unit 9, whereby pressurized air is supplied to the pressure chamber 27 of the clutch 4 from the tank 32. As the clutch 4 is engaged, the rotation power of the crankshaft 2 is transmitted to the speed change mechanism 5 and then to the blower 6, thereby driving the blower 6. At the same time, the main pump 7 is driven, thereby feeding lubrication oil to the bearing 13 and other elements of the speed change mechanism 5. If the main switch 34 is turned off at this point, the electromagnetic valve 31 is turned off, whereby the clutch 4 is disengaged and the blower 6 stops.

On the other hand, if trouble occurs while the blower 6 is being driven, e.g., if the main pump 7 does not function, clogging occurs in a lubrication line, the gears of the speed change mechanism 5 break if the bearings 13 seize up, and the pressure of the lubrication oil drops. Under these conditions, when the lubrication oil pressure decreases below the predetermined value, the pressure switch 8 is turned off. Therefore, even if the main switch 34 is in the ON position, the electromagnetic valve 31 is turned off by the control unit 9, thereby disengaging the clutch 4. Therefore, an excessive brake force is never applied to the crankshaft 2. In other words, the power transmission line of the vehicle is not damaged by the auxiliary brake system, and safe deceleration is ensured.

In the illustrated embodiment, the pressure switch is employed as the pressure sensor and the control unit 9 disengage the clutch 4 via the electromagnetic valve 31 upon the signal from the clutch switch 30 in addition to the signal from the pressure sensor. However, the clutch may be controlled by the signal from the pressure sensor 8 only. Also, the turbo retarder may be connected with the propeller shaft instead of the crankshaft. In addition, the auxiliary pump 23 need not necessarily be provided.

We claim:

1. A retarder adapted for use on a vehicle, comprising:
    a blower connected to a member of a power transmission line of the vehicle;
    a clutch provided between the blower and the member of the power transmission line for selectively connecting and disconnecting the blower from the member of the power transmission line;
    a speed change mechanism provided between the blower and the member of the power transmission line;
    an oil supply device driven by energy transmitted from the clutch and blower for supplying lubrication oil to the speed change mechanism;
    a sensor for detecting a pressure of the lubrication oil supplied to the speed change mechanism; and
    a control unit for allowing the clutch to disconnect the blower from the member of the power transmission line when the lubrication oil pressure detected by the sensor is below a predetermined value.

2. A retarder as defined in claim 1, wherein the member of the power transmission line is a crankshaft of a engine.

3. A retarder as defined in claim 1, wherein the speed change mechanism has an input shaft which receives energy from the member of the power transmission line and an output shaft which sends energy to the blower, and the oil supply device includes a main pump connected with the output shaft of the speed change mechanism.

4. A retarder as defined in claim 1, wherein the pressure sensor includes a pressure switch which is turned off when the lubrication oil pressure detected by the sensor is below the predetermined value.

5. A retarder as defined in claim 3, further including an auxiliary pump of a capacity smaller than the main pump for supplying the lubrication oil to the speed change mechanism, the auxiliary pump being provided between the member of the power transmission line and the clutch and being driven by energy transmitted between the member of the power transmission line and the clutch.

6. A retarder as defined in claim 1, further including an electromagnetic valve for operating the clutch, wherein the control unit is connected with the electromagnetic valve.

7. A retarder as defined in claim 1, further including a power source and a main switch for operating the clutch, wherein the control unit is connected with the power source via the main switch.

8. A retarder as defined in claim 1, wherein the clutch includes a clutch switch having an ON position, the clutch switch being in the ON position when the clutch connects the member of the power transmission line with the blower, and the control unit allows the clutch to disconnect the blower from the power transmission line when the clutch switch has been in the ON position and a pressure switch is turned off.

9. A retarder adapted for use on a vehicle having a crankshaft, comprising:
- a speed change mechanism connected with the crankshaft, the speed change mechanism having at least an output shaft and a bearing;
- a clutch provided between the speed change mechanism and the crankshaft for selectively connecting and disconnecting the speed change mechanism relative to the crankshaft;
- a blower connected to the output shaft of the speed change mechanism;
- an oil supply device for supplying lubrication oil to the bearing of the speed change mechanism;
- a pressure sensor provided at the bearing of the speed change mechanism for detecting a pressure of the lubrication oil supplied from the oil supply device;
- an electromagnetic valve;
- a main switch having an ON position and an OFF position, for allowing the clutch to connect the crankshaft with the blower via the electromagnetic valve when it is in the ON position and to disconnect the crankshaft from the blower when it is in the OFF position;
- a clutch switch for detecting whether the clutch connects the speed change mechanism with the crankshaft; and
- a control unit for allowing the clutch to disconnect the crankshaft from the speed change mechanism via the electromagnetic valve when the clutch switch has detected that the clutch has connected the crankshaft with the speed change mechanism and the oil pressure detected by the pressure sensor drops below the predetermined level.

* * * * *